United States Patent [19]

Steiner et al.

[11] Patent Number: 4,646,945
[45] Date of Patent: Mar. 3, 1987

[54] VENTED DISCHARGE ASSEMBLY FOR LIQUID SOAP DISPENSER

[75] Inventors: Robert L. Steiner, Chicago; Leslie G. Struck, Arlington Heights, both of Ill.

[73] Assignee: Steiner Company, Inc., Chicago, Ill.

[21] Appl. No.: 749,736

[22] Filed: Jun. 28, 1985

[51] Int. Cl.$^4$ ............................................. B65D 37/00
[52] U.S. Cl. ..................................... 222/207; 222/212; 222/213; 222/215; 222/481; 222/490; 137/845; 137/855
[58] Field of Search ............... 222/207, 212, 213, 215, 222/481, 490, 478; 137/844, 845, 859, 846, 855, 857

[56] References Cited

U.S. PATENT DOCUMENTS

| | | |
|---|---|---|
| 1,326,880 | 12/1919 | Rose . |
| 1,416,771 | 5/1922 | Babson et al. ................. 137/845 X |
| 2,605,021 | 7/1952 | Churchill et al. . |
| 2,772,817 | 12/1956 | Jauch ............................. 222/213 X |
| 3,036,592 | 5/1962 | Lips ............................... 137/854 X |
| 3,337,124 | 8/1967 | De Molin et al. ............. 137/845 X |
| 3,542,071 | 11/1970 | Lightner et al. ............. 137/625.46 |
| 3,811,466 | 5/1974 | Ohringer ....................... 137/845 X |
| 3,848,631 | 11/1974 | Fallon ............................ 137/845 X |
| 3,892,259 | 7/1975 | McClocklin ................... 137/625.46 |
| 4,057,177 | 11/1977 | Laauwg ......................... 137/859 X |
| 4,102,476 | 7/1978 | Loeffler ......................... 222/209 |
| 4,120,430 | 10/1978 | French . |
| 4,244,379 | 1/1981 | Smith ............................. 137/845 X |
| 4,345,627 | 10/1982 | Cassia . |
| 4,513,891 | 4/1985 | Hain et al. ..................... 222/213 |

Primary Examiner—Joseph J. Rolla
Assistant Examiner—P. M. Smith
Attorney, Agent, or Firm—Emrich & Dithmar

[57] ABSTRACT

A dispenser for liquid soap includes a compressible nipple having an annular flange mountable on a soap container in communication with the outlet opening thereof, and clamping therebetween a valve assembly including a slitted flexible diaphragm and a backing disc. The disc has a discharge opening in alignment with a check valve slit in the diaphragm for controlling discharge of soap into the nipple for dispensing upon compression of the nipple. The disc and the nipple flange respectively have annular grooves formed in the facing surfaces thereof, a vent valve slit in the diaphragm being aligned with these grooves. The flange groove communicates with the outside of the nipple through a vent opening and the disc groove communicates with the outlet opening of a container through a vent orifice in the disc. The diaphragm thickness is less than the depth of the disc groove and greater than the depth of the nipple flange groove, so that it can open only inwardly to permit air to enter the container, but cannot open outwardly to permit discharge of soap through the vent opening.

16 Claims, 7 Drawing Figures

U.S. Patent  Mar. 3, 1987  4,646,945
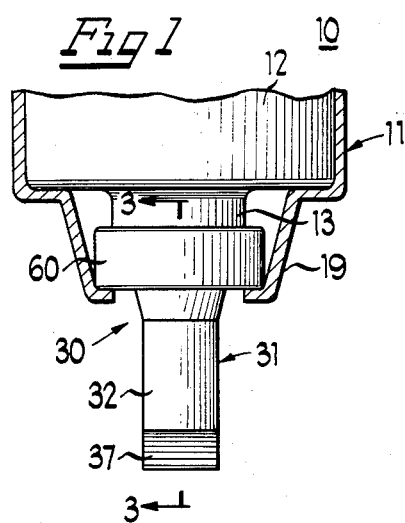
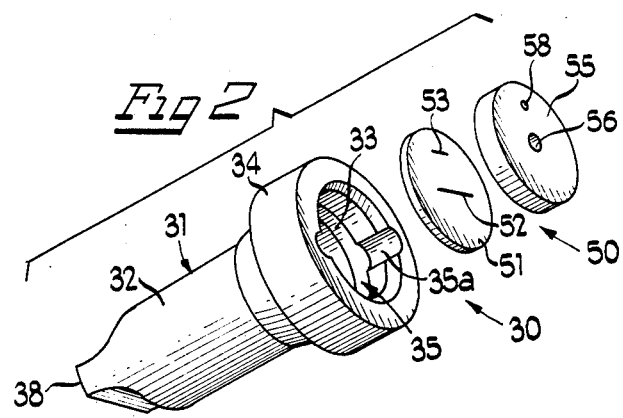
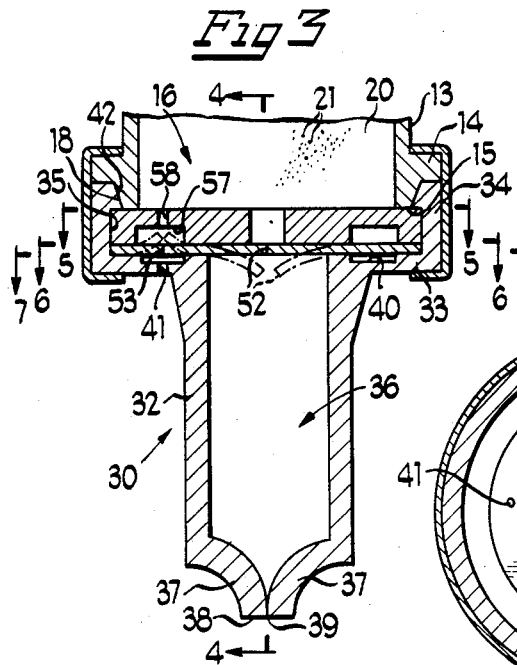

VENTED DISCHARGE ASSEMBLY FOR LIQUID SOAP DISPENSER

BACKGROUND OF THE INVENTION

The present invention relates to apparatus for dispensing liquid soap, normally in discrete small quantities or charges. In particular, the present invention is an improvement of the discharge assembly disclosed in copending application Ser. No. 680,822, of Antonio Macchi Cassia, entitled "Discharge Assembly for Liquid Soap Dispenser," and assigned to the assignee of the present invention.

The soap dispenser disclosed in the aforementioned patent application is of the type which utilizes a flexible or compressible pump means which defines a discharge chamber for receiving soap from a container through a diaphragm-type check valve. When the pump means, which may include a nipple, is compressed it closes the check valve and forces the soap in the discharge chamber out through a discharge opening. However, the discharge assembly disclosed in the aforementioned copending patent application does not provide means for venting the liquid container so as to ensure rapid equalization of the pressures inside and outside the container to facilitate the flow of liquid soap therefrom.

It is known to vent the liquid soap container in a soap dispenser by providing a separate vent opening in the container, typically at the opposite end thereof from the outlet opening. This type of arrangement is disclosed, for example, in U.S. Pat. Nos. 1,326,880 and 4,345,627. But that type of arrangement is disadvantageous because it complicates the manufacture of the container and provides another opening to the container which might accidentally be prematurely opened, increasing the chance of contamination or loss of the liquid soap before the container has been mounted for dispensing use.

It is also known to provide discharge assemblies for dispensers which include vent means for venting a container through its outlet opening. One such arrangement is disclosed in U.S. Pat. No. 2,605,021, but that device includes a very complicated discharge assembly and utilizes a snorkel tube extending up into the container above the fluid level therein. U.S. Pat. No. 4,120,430 discloses a pump-type dispensing apparatus for a spray bottle or the like, which simply uses a vent hole which provides communication between the pumping apparatus and the interior of the bottle. But that arrangement would be completely unsuitable for an arrangement, such as a liquid soap dispenser, wherein the container is inverted in use with the outlet opening disposed downwardly, since the contents of the bottle would leak through the vent opening.

SUMMARY OF THE INVENTION

It is a general object of the invention to provide an improved discharge assembly for a liquid soap dispenser which avoids the disadvantages of prior devices while affording additional structural and operating advantages.

An important object of the invention is the provision of a discharge assembly for a liquid soap container which provides for venting of the container through its outlet opening.

In connection with the foregoing object, it is another object of the invention of the type set forth, which provides a vent path through the discharge assembly while effectively preventing discharge of liquid soap through the vent path.

In connection with the foregoing objects, still another object of the invention is the provision of a discharge assembly of the type set forth, which includes one-way valve means in the vent path.

Yet another object of the invention is the provision of a discharge assembly of the type set forth, which is of simple and economical construction.

It is another object of the invention to provide a discharge assembly of the type which utilizes a compressible discharge nipple through which the vent path passes and permits proper registration of the valve means with the vent path regardless of the angular orientation of the nipple.

These and other objects of the invention are attained by providing a discharge assembly for a liquid soap container having an outlet opening, the discharge assembly comprising: discharge means defining a discharge path and adapted to be coupled to the container for controlling the discharge of liquid soap from the outlet opening, the discharge means including means defining a vent path spaced from the discharge path and providing communication between atmosphere and the outlet opening of the container, and one-way valve means disposed in the vent path and shiftable between a closed condition closing the vent path and an open condition permitting air to enter the container through the vent path and the outlet opening for equalizing the pressures inside and outside the container, thereby to facilitate the flow of liquid soap therefrom through the outlet opening.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary, elevational view in partial section of a liquid soap dispenser, including a discharge assembly constructed in accordance with and embodying the features of the present invention;

FIG. 2 is an exploded, perspective view of the discharge assembly of FIG. 1;

FIG. 3 is an elongated, fragmentary view in vertical section taken along the line 3—3 in FIG. 1, and illustrating the discharge assembly in its normal rest position;

FIG. 4 is a fragmentary view in vertical section taken along the line 4—4 in FIG. 3;

FIG. 5 is a view in horizontal section taken along the line 5—5 in FIG. 3;

FIG. 6 is a view in horizontal section taken along the line 6—6 in FIG. 3; and

FIG. 7 is a view in horizontal section taken along the line 7—7 in FIG. 3.

DESCRIPTION OF THE PREFERRED EMBODIMENT

Referring to FIGS. 1, 3 and 4, there is illustrated a liquid soap dispenser, generally designated by the numeral 10, including a discharge assembly 30, constructed in accordance with and embodying the features of the present invention. The dispenser 10 includes a housing 11, which may be mounted by suitable means (not shown) on a wall or other support surface, and in which is disposed a container 12 of liquid soap. The container 12 may be in the form of a bottle or the like which is replaceably mounted in the housing 11, so that when it is empty it can be replaced with a full container.

The container 12 has a cylindrical neck 13 at its lower end provided with an annular flange 14 extending radially outwardly therefrom around the circumference thereof. The neck 13 has a flat annular end surface 15 at its distal end and defines a cylindrical outlet opening 16 of the container 12. The neck 13 has a frusto-conical outer wedge surface 18 at its lower end extending between the flange 14 and the end surface 15. The housing 11 includes a generally cylindrical retainer 19 which is disposed for substantially enclosing the neck 13 and portions of the associated discharge assembly 30. The container 12 contains liquid soap 20 (FIG. 3), which may be of the type containing particles 21 of grit suspended therein, the grit particles 21 being of a suitable material for providing an abrasive or scouring function, in a known manner.

Referring now also to FIGS. 2 and 5-7 of the drawings, the discharge assembly 30 includes an elongated, generally circularly cylindrical nipple 31 formed of a suitable flexible, resilient material, such as rubber. The nipple 31 has a cylindrical side wall 32 provided at one end thereof with a radially outwardly extending annular flange 33, integral at the outer periphery thereof with an upstanding cylindrical wall 34 which defines an inlet opening into the nipple 31. The cylindrical wall 34 has an annular groove 35 formed on the inner surface thereof adjacent to the flange 33, the wall 34 also being provided with two diametrically opposed and axially extending part-cylindrical notches 35a communicating with the groove 35.

The nipple 31 defines a discharge chamber 36 therein, and is provided at its distal end with a pair of radially inwardly sloping concave walls 37 which cooperate to form a flat, narrow duckbill-shaped tip 38 at the distal end of the nipple 31 closing the discharge chamber 36. Formed in the tip 38 and extending longitudinally thereof, substantially diametrically of the nipple 31, is an elongated discharge slit 39, which is normally held closed by the resilient bias of the nipple 31.

Formed in the upper or inner surface of the flange 33 is an annular groove or recess 40, substantially rectangular in transverse cross section, and disposed coaxially with the side wall 32. A vent hole 41 extends through the flange 33 in a direction substantially parallel to the axis of the side wall 32 and communicates with the recess 40. The upper end of the cylindrical wall 34 is provided on the inner surface thereof with a frustoconical wedge surface 42, for a purpose to be explained more fully below.

Seated on the upper or inner surface of the flange 33 of the nipple 31 is a valve asembly 50, which includes a thin circular membrane or diaphragm 51, dimensioned to just fit within the groove 35, the diaphragm 51 being formed of a suitable flexible resilient material impermeable to liquid soap. The diaphragm 51 has a straight-line check valve slit 52 formed therein centrally thereof and extending substantially diametrically. The diaphragm 51 also has a shorter straight-line vent valve slit 53 therein disposed substantially parallel to the slit 52 in position for registry with the annular recess 40 when the diaphragm 51 is seated on the nipple flange 33. The diaphragm 51 has a thickness which is greater than the depth of the annular recess 40.

The valve assembly 50 also includes a circular backing disc 55 which is also disposed in the groove 35 and overlies the diaphragm 51. The backing disc 55 may be formed of a suitable plastic, and has a circular discharge aperture 56 formed therethrough centrally thereof for registry with the check valve slit 52 in the diaphragm 51. Formed in the bottom surface of the backing disc 55 is an annular groove or recess 57, substantially rectangular in transverse cross section and disposed coaxially with the disc 55, the recess 57 having a depth greater than the thickness of the diaphragm 51. A vent aperture 58 extends through the backing disc 55 in a direction parallel to the axis thereof and communicates with the annular recess 57 for cooperation therewith to define a vent passage through the backing disc 55.

It will be appreciated that the notches 35a in the nipple 31 facilitate flexure thereof to permit insertion of the valve assembly 50 in the groove 35. When the parts are thus assembled, it will be appreciated that the vent hole 41, the annular recesses 40 and 57 and the vent aperture 58 all cooperate with the vent valve slit 53 in the diaphragm 51 to define a vent path through the discharge assembly 30. While, in FIG. 3, the parts are illustrated with the vent hole 41, the vent valve slit 53 and the vent aperture 58 all being in vertical alignment with one another, it is a significant aspect of the invention that this alignment is not necessary in order to effect the vent path. More particularly, because of the annular recesses 40 and 57, the vent path will be formed regardless of the annular or rotational orientation of the nipple 31, the diaphragm 51 and the backing disc 55 relative to one another. This greatly simplifies assembly of the parts.

In use, when the discharge assembly 30 has been assembled as described above, it is mounted on the container 12. More specifically, the cylindrical wall 34 is fitted over the distal end of the neck 13 in surrounding relationship therewith, until the wall 34 abuts the flange 14, and the end surface 15 of the neck 13 engages the upper surface of the backing disk 55, as illustrated in FIG. 3. In this arrangement, the frusto-conical surfaces 18 and 42 will be in wedging engagement with each other to form a fluid-tight seal between the cylindrical neck 13 and the nipple 31. In this mounted configuration, the valve assembly 50 is disposed for controlling the flow of liquid soap between the outlet opening 16 of the container 12 and the inlet opening of the nipple 31.

A generally cylindrical retaining clip 60 is then applied to hold the discharge assembly 30 in place on the neck 13, the clip 60 having parallel, spaced-apart, annular upper and lower flanges 61 and 62, respectively engaging the outer surfaces of the flanges 14 and 33, securely to clamp the cylindrical wall 34 of the nipple 31 against the flange 14 of the neck 13. There may also be provided an actuator (not shown) which is carried by the housing 11 by suitable means for engagement with the outer surface of the nipple 31, as explained in the aforementioned U.S. patent application Ser. No. 680,822.

Preferably, the discharge assembly 30 is assembled on the container 12 when the neck 13 is disposed upwardly. Then, after assembly, the container 12 is inverted and mounted in the housing 11, as indicated in FIG. 1, with the nipple 31 projecting downwardly through and from the bottom of the retainer 19. The nipple 31 is oriented so that the actuator engages the nipple 31 toward one side of the discharge slit 39, rather than at an end thereof.

It will be noted that when the discharge assembly 30 is mounted on the container 12, the vent aperture 58 communicates with the outlet opening 16 of the container 12. Thus, the vent path through the discharge assembly 30 permits venting of the container 12 through its outlet opening 16, obviating any other vent opening in the container 12. More specifically, when the pressure within the container 12 is less than atmospheric pressure, the vent valve slit 53 will open upwardly, as indicated in broken lines in FIG. 3, permitting air to enter the container 12 through the vent path. It will be appreciated that the depth of the annular recess 57 permits a sufficient deflection of the diaphragm 51 to open the vent valve slit 53. When the pressure in the container 12 reaches atmospheric pressure, the vent valve slit 53 closes. It is a significant feature of the invention, that the depth of the annular recess 40, being less than the thickness of the diaphragm 51, does not permit sufficient downward deflection of the diaphragm 51 to open the vent valve slit 53. This prevents escape of liquid soap through the vent path, in the event that the pressure within the container 12 should exceed atmospheric pressure.

Because of this venting of the container 12, atmospheric pressure plus the weight of the liquid soap 20 on the diaphragm 51 will force the check valve slit 52 open, allowing liquid soap to flow through the discharge aperture 56 in the backing disk 55 and through the check valve slit 52 into the discharge chamber 36 in the nipple 31. This flow will continue until the discharge chamber 36 is filled, at which point the pressure on the opposite sides of the diaphragm 51 will be equalized, thereby allowing the check valve slit 52 to close in an equilibrium condition, illustrated in FIGS. 3 and 4. The nipple 31 is so constructed that in this normal equilibrium condition, the natural resilient bias of the nipple 31 will hold the discharge slit 39 closed against the weight of the charge of liquid soap 20 contained in the discharge chamber 36.

When it is desired to dispense a charge of liquid soap, a user operates the actuator for compressing the side of the nipple 31, as is more fully explained in the aforementioned U.S. application Ser. No. 680,822. This compression of the cylindrical wall 32 of the nipple 31 raises the pressure in the discharge chamber 36, so that it holds the check valve slit 52 of the valve assembly 50 closed, and forces the ejection of a charge of liquid soap from the discharge slit 39.

When the actuator is released, it will return to its normal rest position under the urging of suitable bias means (not shown), and the compressed wall of the nipple 31 will tend to return to is normal expanded condition as a result of the natural resilience of the nipple 31. This reexpansion of the nipple 31 will lower the pressure therein to a pressure below that in the container 12, so as to allow the discharge slit 39 to reclose and to open the check valve slit 52 and draw in a new charge of liquid soap from the neck 13. When the discharge chamber 36 is filled, the discharge assembly 30 returns to its equilibrium condition.

It will be appreciated that, because the actuator engages the nipple 31 in a direction perpendicular to the longitudinal axis thereof and perpendicular to the direction of the discharge slit 39, the initial compression of the nipple 31 will not cause the discharge slit 39 to be directly distorted into an open condition, as would be the case if the nipple 31 were to be compressed from an end of the discharge slit 39. Thus, liquid soap cannot be discharged from the discharge slit 39 until the pressure within the discharge chamber 36 has been raised sufficiently to force the ejection of liquid soap through the discharge slit 39, at which pressure the check valve slit 52 will be held closed.

Because the liquid soap 20 is discharged directly from the nipple 31, there are no narrow passages to be clogged by the grit particles 21. Furthermore, the pumping action of the nipple 31 during the discharge operation serves to flush accumulated grit particles 21 from the discharge chamber 36 during each dispensing operation.

In a model of the present invention, the nipple 31 is of unitary, one-piece construction, and may be formed by molding. The container 12 may be formed of a suitable plastic, and the housing 11, the retainer 19 and the actuator may be formed of plastic or metal. It will be appreciated that the discharge assembly 30 can readily be assembled and mounted on the container 12 without the use of tools.

From the foregoing it can be seen that there has been provided an improved liquid soap dispenser and discharge assembly therefor, which is of simple and economical construction and assembly, and permits venting of the liquid soap container through the outlet opening thereof while preventing leakage of soap through the vent path.

We claim:

1. A discharge assembly for a liquid soap container having an outlet opening, said discharge assembly comprising: discharge means defining a discharge path and adapted to be coupled to the container for controlling the discharge of liquid soap from the outlet opening, said discharge means including a flange extending laterally outwardly therefrom, said discharge means including means defining a vent path spaced from said discharge path and providing communication between atmosphere and the outlet opening of the container, one-way valve means disposed in said vent path and shiftable between a closed condition closing said vent path and an open condition permitting air to enter the container through said vent path and the outlet opening for equalizing the pressures inside and outside the container, and control means on said flange preventing said one-way valve means from opening in a direction which would prevent flow of liquid through said vent path, thereby to facilitate the flow of liquid soap therefrom through the outlet opening.

2. The discharge assembly of claim 1, wherein said valve means includes a diaphragm extending across said vent path and having a valve slit formed therein.

3. The discharge assembly of claim 1, wherein said discharge means comprises means for effecting discharge of only a predetermined limited quantity of liquid soap during a dispensing operation.

4. The discharge assembly of claim 3, wherein said discharge means includes a compressible nipple having a normally closed discharge opening.

5. A discharge assembly for liquid soap container having an outlet opening, said discharge assembly comprising: a compressible nipple defining a discharge chamber and adapted to be mounted on the container for receiving liquid soap through the outlet opening thereof, said nipple having a normally closed discharge opening which opens in response to compression of said nipple for emitting a charge of liquid soap from said discharge chamber, said nipple having a vent opening therein spaced from said discharge chamber, means defining a vent passage providing communication between said vent opening and the outlet opening of the container, an annular flange extending laterally outwardly from said nipple one-way valve means disposed in said vent passage and shiftable between a closed condition closing said vent passage and an opening condition permitting air to enter the container through said vent opening and said vent passage and the outlet opening for equalizing the pressures inside and outside the container, and control means on said flange for preventing opening of said one-way valve means in a direction which would permit flow of liquid soap through said vent opening, thereby to facilitate the flow of liquid soap therefrom through the outlet opening.

6. The discharge assembly of claim 5, wherein said flange extends laterally outwardly around the entire circumference of said nipple, said vent opening being formed in said flange.

7. The discharge assembly of claim 5, wherein said valve means includes a diaphragm extending across said vent passage and having a valve slit therein disposed in registry with said passage.

8. The discharge assembly of claim 7, wherein said diaphragm extends across said discharge chamber and has a check valve slit therein in registry with said chamber.

9. The discharge assembly of claim 5, and further including check valve means for permitting only one way flow of liquid soap from the container into said discharge chamber.

10. The discharge assembly of claim 5, wherein said passage-defining means includes a disc extending across the outlet opening of the container, said disc having a discharge aperture therein providing communication between the outlet opening and said discharge chamber.

11. The discharge assembly of claim 10, wherein said disc has an annular recess formed in one surface thereof for communication with said vent opening regardless of the angular orientation of said nipple, and a vent orifice formed in said disc communicating with said channel for cooperation therewith to define said vent passage.

12. A discharge assembly for a liquid soap container having an outlet opening, said discharge assembly comprising: a compressible nipple having a normal expanded condition defining a discharge chamber for accommodating a charge of liquid soap, said nipple having an inlet opening at one end thereof and being provided at the other end thereof with a normally closed discharge slit, an annular flange extending laterally outwardly from said nipple, means mounting said nipple on the container with said inlet opening disposed in registry with the container outlet opening, said nipple having a vent opening therein spaced from said discharge chamber, a valve diaphragm extending across said inlet opening and having first and second valve slits therein respectively disposed in registry with said discharge chamber and said vent opening, a backing disc overlying said diaphragm and having a discharge aperture therein disposed in registry with said first valve slit and having a vent passage therein disposed for providing communication between said second valve slit and the outlet opening of the container, said nipple being laterally compressible to a compressed condition, movement of said nipple to the compressed condition thereof raising the pressure in said discharge chamber for closing said first valve slit and ejecting liquid soap from said discharge opening, movement of said nipple back to the expanded condition thereof lowering the pressure in said discharge chamber for closing said discharge opening and opening said first valve slit to draw a new charge of liquid soap into said discharge chamber, said second valve slit being responsive to atmospheric pressure greater than the pressure within the container for opening to admit ambient air to the container through said vent opening and said vent passage for raising the pressure within the container to facilitate the flow of liquid soap from the outlet opening thereof, and means on said flange for preventing the opening of said second valve slit in response to a pressure inside the container greater than atmospheric pressure, thereby to prevent the escape of liquid soap through said vent opening.

13. The discharge assembly of claim 12, wherein said backing disc has an annular recess or channel formed in one surface thereof and disposed for communication with said vent opening regardless of the angular orientation of said nipple, and a vent orifice formed in said disc communicating with said channel for cooperation therewith to define said vent passage.

14. The discharge assembly of claim 13, wherein said flange extends laterally outwardly around the entire perimeter of said nipple, said vent opening being formed in said flange.

15. The discharge assembly of claim 14, wherein said annular flange of said nipple has an annular recess formed in the inner surface thereof in communication with said vent opening and disposed for registration with said second valve slit for providing communication between said vent opening and said second valve slit regardless of the angular orientation of said nipple.

16. The discharge assembly of claim 15, wherein said recess in annular flange of said nipple has a depth substantially less than the thickness of said diaphragm so as to prevent outward flexure of said diaphragm a distance sufficient to permit opening of said second valve slit.

* * * * *